United States Patent [19]

Yanagisawa

[11] Patent Number: 4,487,164
[45] Date of Patent: Dec. 11, 1984

[54] HYDROPONIC PET FEEDING DEVICE

[75] Inventor: Masayasu Yanagisawa, Tokyo, Japan

[73] Assignee: The Greenterior Co., Ltd., Tokyo, Japan

[21] Appl. No.: 393,926

[22] Filed: Jun. 30, 1982

[30] Foreign Application Priority Data

Aug. 18, 1980 [JP] Japan ................... 55-116009

[51] Int. Cl.³ .............................................. A01K 5/00
[52] U.S. Cl. ...................................... 119/51.5; 47/59
[58] Field of Search ............... 119/51.5, 51 R; 47/59, 47/62

[56] References Cited

U.S. PATENT DOCUMENTS

| 2,175,113 | 10/1939 | Fischer | 47/59 |
| 2,937,617 | 5/1960 | Brody et al. | 119/51.5 |
| 3,017,859 | 1/1962 | Stern | 119/51.5 |
| 4,133,141 | 1/1979 | Lee | 47/59 |

Primary Examiner—Jay N. Eskovitz
Attorney, Agent, or Firm—Sughrue, Mion, Zinn, Macpeak and Seas

[57] ABSTRACT

A device for watering and feeding pets such as birds includes a water filled container upon which a hydroponic device is allowed to float. The container is removably connected to a mesh like structure which allows the animals to feed upon the plants without being able to reach the seeds. The device may include a portion wherein the water is readily accessible for drinking by the animals, if desired.

1 Claim, 6 Drawing Figures

HYDROPONIC PET FEEDING DEVICE

BACKGROUND OF THE INVENTION

The present invention relates to a device for feeding and watering pets such as birds and small domestic animals, and particularly to a device in which fresh greens may be hydroponically grown as a food supply for such small animals.

SUMMARY OF THE INVENTION

A primary object of the present invention is to provide a device capable of supplying fresh greens to birds and the like, and in some cases acting as a water supply as well.

It is a further object of the present invention to provide such a device in which birds or other small animals are prevented from eating the plant seeds, but are allowed to eat the sprouts after the seeds have germinated.

It is a still further object of the present invention to provide such a device in which the supply of plant seeds and/or water may be easily replenished.

DETAILED DESCRIPTION OF THE PREFERRED EMBODIMENTS

Figure 1:
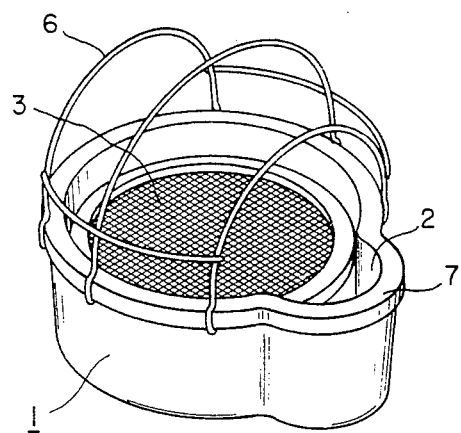
FIG. 1 is a perspective view showing one embodiment of the device of the present invention.
Figure 2:
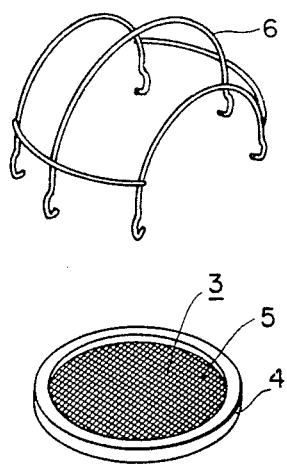
FIG. 2 is an exploded view showing the components of the device of FIG. 1.

In FIGS. 1 and 2, a water basin generally indicated at 1 is composed of, for example, a shallow circular container having a lip 2 at one end thereof. The container 1 is provided with a rim 7 about the top edge thereof to which a covering 6 made of a coarse grid of plastic metal wires is removably connected and supported thereby.

A hydroponic device 3 of a size fitting easily within the basin 1 is formed of a circular float ring 4 fitted with a fine mesh structure 5. When the basin is filled with water, the device 3 will float on the surface thereof, with sufficient water reaching the mesh area so as to allow germination of seeds placed thereon. As illustrated, the hydroponic device is of circular form, but it is obvious that other shapes may be used as desired. Also, although the covering has been described as being of plastic suitable metallic wires, etc., may be used as well. If a circular hydroponic device 3 is used as is illustrated in FIG. 1, a space remains at the lip 2 of the device from which the animal may freely drink. The covering 6 is designed such that the openings therein will permit an animal to feed upon the small plants growing within the device, but will not allow the animal to reach the seeds, so that the seeds may properly germinate and grow.

The lip 2 also permits easy refilling of the water supply, and easy removal of the floating device 3, as necessary.

Figure 3:
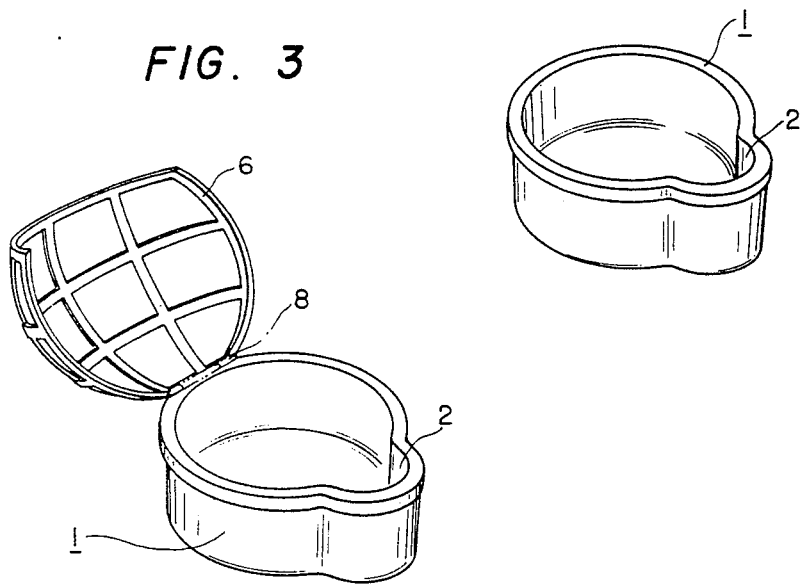
FIG. 3 is a perspective view showing a second embodiment of the device according to the invention.

Illustrated in FIG. 3 is a second embodiment of the device, wherein the basin 1 is connected to the covering 6 by means of a hinge 8. This embodiment facilitates removal and replacement of the hydroponic device as compared to the embodiment of FIG. 1, wherein it is necessary to completely disconnect the cover from the rim 7 by applying force thereto. While the cover in the FIG. 1 device must be somewhat resilient for this purpose, the cover member 6 in FIG. 3 need not be.

In using the device of FIG. 1 or 3, the basin 1 is filled with water and hydroponic device 3 is allowed to float thereon after seeds of a plant variety suitable for the animal are placed on the mesh 5. These seeds will be in contact with the water, and thus will germinate. The roots, seeking the water, will travel through the mesh 5 to the other side, while the seed pod remains on the mesh surface and the plant of course extends outwardly therefrom. The growing plants will then extend through the wires of the grid of the cover 6 so that the animal can suitably reach the plants. As mentioned previously, the space between the wires is not large enough for the animal to reach the seeds, so there is no possibility that the seeds may be eaten before the plant grows. The level of the water in the basin 1 will be gradually decreased due to evaporation and consumption by the animals, but at the same time, the hydroponic device will be lowered to permit continued growth of the plants. When necessary, the water may be replenished and the hydroponic device 3 removed or replaced, as desired, as described above.

Figure 4:
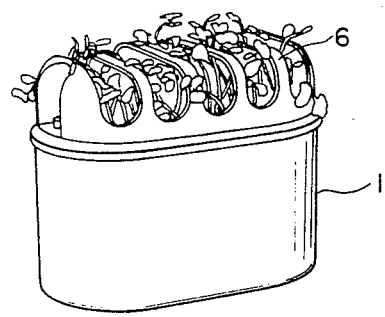
FIG. 4 illustrates an example of a third embodiment according to the invention.

A futher embodiment of the device is illustrated in FIG. 4. In this embodiment, the container 1 is of oval shape, and the cover member 6 is of a like shape so as to be seated thereon. The cover is generally arranged in the form of a plurality of parallel strips running longitudinally across the width of the container, and raised thereabove to a certain extent to form a vaulted shape. The spacing between the strips is designed, as previously, so as not to allow the bird or other pet to reach the seeds before they are allowed to grow. Beneath the cover 6 is arranged the hydroponic device 3, which is also of oval shape and may have a float ring around the perimeter. Also, within the container there may be provided vertical ribs running along the wall which will support the hydroponic device as a certain height. The manner of the use of this device is similar to that of the foregoing embodiments.

In practice, however, it has been found that a difficulty remains in the embodiment of FIG. 4, due to the fact that it is difficult to supply additional water. This is due to the fact that, as the plants grow, they become intertwined with the cover 6 and thus it becomes difficult to remove the same without damaging the plants and lifting the entire hydroponic device by the stems. Accordingly, there has been developed an improved device as illustrated in FIGS. 5a and 5b.

In this embodiment, the cover is made quite similarly as previously, and is provided with a peripheral rim 10 which seats upon a ledge 12 of the container 1 when placed thereover. The hydroponic device 3 is provided with a float ring 4 about its periphery and a central net like grid 5 as before. Additionally, the hydroponic member is provided with a central vertical standard 15 which extends upwardly from the net 5 through the cover 6.

In use, the device is filled with water, and the hydroponic device is allowed to float on the surface thereof. After the water is consumed to a certain degree, the float ring 4 will abut against vertically extending net support ribs 16, such that the hydroponic member 3 will be supported thereon. Several of the ribs 16 are provided in the interior of the container 1 for this purpose. The length of the standard 15 is designed so that it may be easily grasped even after the device 3 has reached its lowest position.

Figure 5A:
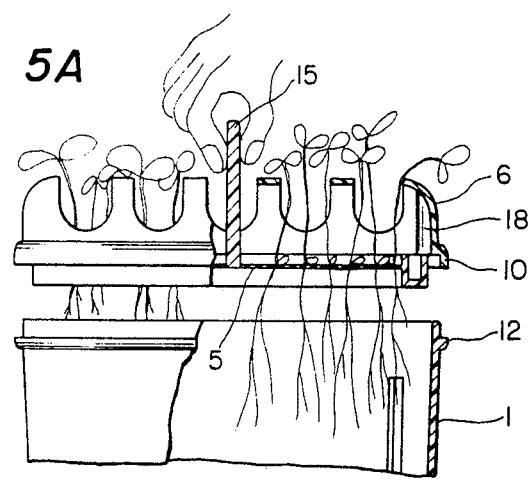
FIGS. 5a and 5b are side elevational views, with some parts in section, showing a feeding device according to a further embodiment of the invention.
Figure 5B:
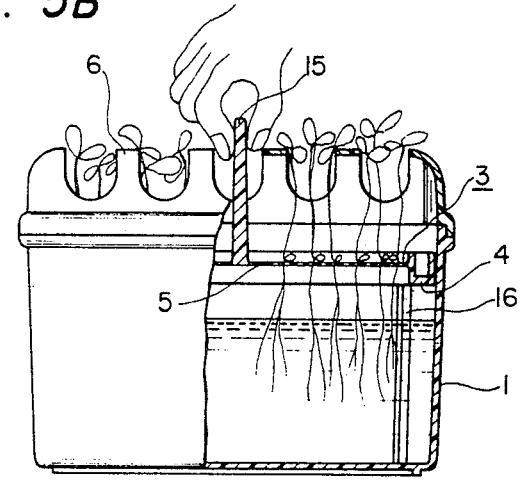

When the water level becomes still lower and it becomes necessary to refill the container, the member 3 is lifted via the standard, and the device 3, the cover 6 and the plants are unitarily removed, as seen in FIG. 5a. After the member 3 is lifted to a certain extent, the peripheral edges of the float ring 4 will engage abutments 18 provided about the inner periphery of the cover member. In this manner, the cover will be suitably supported by the hydroponic device when the latter is lifted by means of the standard 15. After the water is replenished, the members are replaced merely by lowering them into the correct position. In doing so, the rim 10 of the cover 6 will first abut the ledge 12, whereupon the hydroponic member 3 will continue to be lowered until it floats upon the surface of the water or is supported by the ribs 16. Thus, it is quite easy to service the device as needed, and it is unnecessary to damage the plants in doing so.

As described above, the device of the present invention is capable of growing and maintaining a supply of fresh plants available for the feeding of small animals, particularly birds. Since the plants continually grow and the animals are prevented from eating the seeds, a substantially continuous supply of food is assured over an extended period of time. Therefore, the pet owner need not be concerned when travelling away from home for several days, as the animal's food supply will not be diminished during this amount of time in normal use.

What is claimed is:

1. A pet feeding device comprising a container adapted to hold water, a hydroponic device capable of floating on the water, means on said container limiting the descent of said hydroponic device into said container, an apertured cover extending over the container and resting on the upper edges thereof, a vertically disposed standard secured to said hydroponic device and extending upwardly through said apertured cover, and abutment means on said cover adapted to engage said hydroponic device upon lifting of said hydroponic device from the water by means of said standard so that the cover will be simultaneously lifted with said hydronponic device.

* * * * *